(No Model.)
E. J. MALLETT, Jr.
APPARATUS FOR PROMOTING THE COMBUSTION OF FUEL IN FURNACES.
No. 258,451. Patented May 23, 1882.
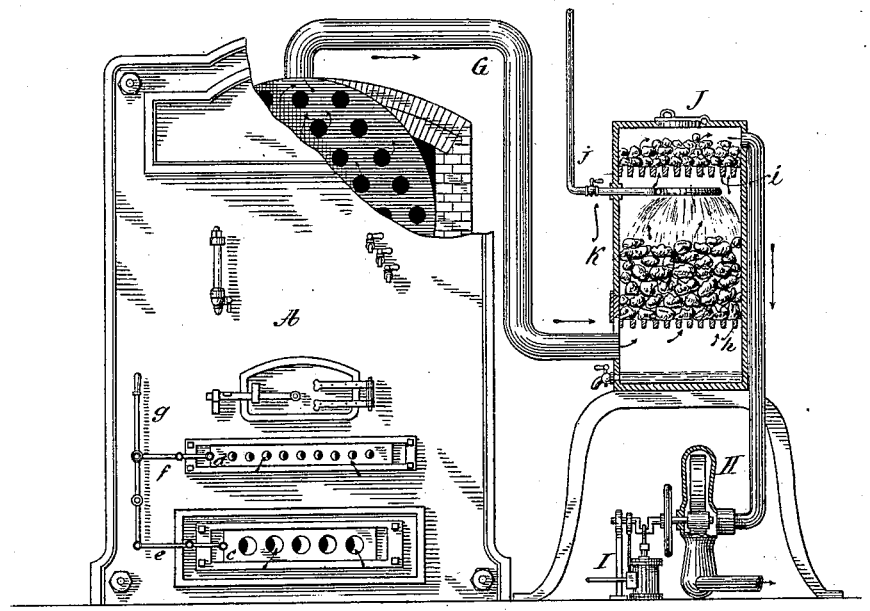
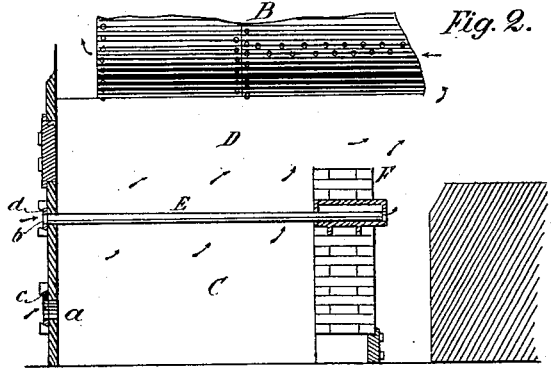

UNITED STATES PATENT OFFICE.

EDWARD J. MALLETT, JR., OF NEW YORK, N. Y.

APPARATUS FOR PROMOTING THE COMBUSTION OF FUEL IN FURNACES.

SPECIFICATION forming part of Letters Patent No. 258,451, dated May 23, 1882.

Application filed November 28, 1881. (No model.)

*To all whom it may concern:*

Be it known that I, EDWARD J. MALLETT, Jr., of the city, county, and State of New York, have invented certain new and useful Improvements in Apparatus for Promoting the Combustion of Fuel in Boiler and other Furnaces, of which the following is a specification.

It is well known that in even the most approved types of furnaces hitherto in use there is at the best an imperfect and incomplete combustion of the fuel employed, a large percentage passing off unutilized in the form of gaseous products of combustion, which are unconsumed and wasted.
It is my object to effect as far as possible complete combustion of all the fuel, gaseous as well as solid, so as to utilize the same in the production of heat; and it is to this end that my present improvements have been devised.

To attain the result which I have in view it is essential that a draft or current through the furnace should be created and maintained by an active mechanical appliance—such, for instance, as a fan—instead of relying on a chimney, smoke-stack, or the like. It is also essential that this appliance should act to draw or suck the air through the furnace, instead of impelling or forcing it into the furnace, as has been in some instances essayed hitherto. The appliance, which we will suppose to be a fan, in acting thus, however, necessarily takes heated and consequently expanded air, unless some means be provided by which the temperature of the air can be reduced before it reaches the fan. The objection to taking heated air into the fan is that the latter must necessarily be of a much larger size and require more power to drive it than would otherwise be the case.
Air expands to about twice its volume for every 480° of heat, or thereabout, so that the air which enters the inlet end of the furnace is largely increased in volume by the action of the heat before it reaches the fan, which, in order to maintain the requisite draft, must consequently be of considerably greater capacity or require much more power to drive it than would be the case if the air which passes through it had the same temperature as it had when first entering the furnace. For this reason I interpose between the furnace and the fan or air-suction device an appliance which I term a "condenser," through which all the air drawn through and from the furnace passes, and by which it is cooled down or condensed before reaching the fan. The condenser may be made in various ways. The preferred form of condenser is a vessel containing coke or other suitable material, upon which water in comparatively small quantity is constantly discharged. The heated air passing up through the coke is brought into direct contact with the water trickling or filtering down through the same, and by this direct contact is readily cooled down to the proper extent. The water, on the other hand, becomes hot, and may in this condition be conducted off to the boiler or used for other purposes. It may be remarked here that the same effect can measurably be produced in condensers of other kinds, where water or other suitable liquid, instead of having direct contact with the flue products, can be caused to circulate through piping or tubing with which the flue products will have contact on their way to the fan.

To the attainment of the object I have in view it further is essential to employ, in connection with the suction-draft—by which I mean the draft induced by the sucking or drawing action of the fan or similar appliance—separate air ducts or inlets, the one admitting air beneath the grate-bars in the usual way, and the other admitting air at a point beyond the bridge-wall of the furnace, or at some other point—as, for instance, through the bridge-wall or through the furnace-walls above the fuel—where it will meet and cause a combustion of the fuel-gases, and to provide, in connection with these separate air-inlets, registers or gates by which the proportionate volumes of air admitted at these points may be regulated and varied at pleasure.

While I do not desire to be understood as limiting myself to any particular point at which the air for producing combustion of the fuel-gases shall be introduced into the furnace, yet I prefer, on the whole, to introduce it at a point beyond the bridge-wall. In order to provide for admitting air at this point, it is most desirable and convenient, on the whole, to use tubular grate-bars open at both ends, and to provide their outer ends, as well as the air-inlet openings in the ash-pit, with gates or registers, by means of which the amount of air admitted at each of these points can be regulated with great nicety.

Having indicated the nature and scope of my improvements, I shall now proceed to describe the apparatus illustrated in the accompanying drawings, which is a boiler-furnace containing my said improvements in their preferred form.

Figure 1 is a front elevation, partly in section, of the furnace. Fig. 2 is a diagrammatical longitudinal vertical section of the fire-box. Fig. 3 is a view of the water-distributer used in the condensers.

A is the body of the furnace, and B the boiler. These parts may be of any approved construction.

C is the ash-pit, and D is the fire-box. The grate-bars E are metal tubes, open from end to end. Their front ends are supported in and open through the front wall of the furnace. Their rear ends are supported in and extend through to the rear of the bridge-wall F. Air for supporting combustion enters in part through openings $a$ in the ash-pit and passes up through the interstices of the grate in the usual way, and in part also enters the open front ends, $b$, of the grate-bars, and, passing through said bars, is discharged into the furnace at the rear of the bridge-wall, as indicated by the arrows in Fig. 2, whence it rises, and, mingling with the gaseous products passing from the fire-box over the bridge-wall, completes the combustion of these products. In order to produce this result, however, it is essential, as before said, that there should be a positive suction-draft. It is by this means that the proper volume of air is drawn through the hollow grate-bars. The proportionate shares supplied through the fire-box and the hollow bars of the total volume of air passing through the furnace should be varied according to the nature of the fuel employed and the condition of the fire; and to this end I provide the inlets $a$ and $b$ with sliding gates or registers $c$ and $d$, by which each set of openings may be more or less opened, as desired. These registers $c\ d$ may be of any suitable kind, and can be arranged to be operated independently of one another, if desired. I prefer, however, to connect them by pivoted or jointed connecting-bars $e f$, as shown, to opposite arms of a centrally-pivoted lever, $g$, which actuates simultaneously both registers, the arrangement being such that in proportion as the one register is opened the other will be closed, so that, while the sum of the volumes of air drawn in through both sets of openings $a\ b$ by the action of the air-suction appliance will remain constant, these volumes may vary with relation to one another.

It will be understood that, while I prefer to use hollow grate-bars, they are not essential. What is essential is that there should be two distinct sources of air-supply, the one supplying air which shall pass through the fuel in the fire-box, the other admitting air to the furnace at a point beyond the bridge-wall, where it will meet only the products of combustion, and the tubular grate-bars are a convenient means for the latter purpose.

Taking the place of the ordinary chimney or smoke-stack is a pipe, G, which I shall term the "draft-flue." To this draft-flue is connected a fan, H, worked by a small engine, as indicated at I, or by any other suitable motor. This fan, when in action, draws the air through the inlets $a\ b$ into and through the furnace, and is the air drawing or sucking appliance hereinbefore referred to.

In the flue, at a point intermediate between the furnace and the fan, is interposed a condenser, J, here shown as consisting of a drum provided with two sets, $h\ i$, of grate-bars, and an intermediate water-distributing pipe, $j$. Upon both grates rest masses of coke or other suitable material, $k$. The water-distributer $j$ is a pipe having a ring-like end finely perforated like a rose, and is supplied with water from any suitable source. The heated air from the furnace enters below the lower grate, $h$, and thence passes up through the mass of coke resting thereon, meeting on its way the water which is constantly discharging from the water-distributer and trickling or filtering down through the coke. The effect of this is to cool down the air and diminish its volume, which cooling effect is still further enhanced by the passage of the air through the coke resting on the upper grate, $i$. The object, however, of this upper grate and bed of coke thereon is mainly to prevent the air, as it is drawn upward, from carrying along with it out from the condenser any spray or particles of water. The upper coke-bed effectually prevents this. The water passing down through the coke and heated by contact with the hot air gathers in the bottom of the condenser and passes off through a cock or valve controlled pipe, $k$. The cooled air, after leaving the condenser, is drawn into and discharged from the fan into the surrounding atmosphere.

I do not here claim broadly the combination of tubular grate-bars open from end to end and conducting air from the outside to a point beyond the bridge-wall of the furnace, with air-inlet openings in the ash-pit and registers or gates controlling the air-inlets of both the bars and the ash-pit; nor do I here claim broadly the combination of these instrumentalities when the registers are connected to and operated simultaneously by a single lever-handle, so that in proportion as the one register closes the other will open. These features I have made the subject of a separate application for Letters Patent of even date herewith. I also state that I do not claim broadly the use of a condenser, whether a water-contact condenser or not, interposed between a furnace and a suction-fan or air-exhauster; but, Having described my improvement and the best way known to me of carrying the same into effect, what I here claim, and desire to secure by Letters Patent, is as follows:

1. The combination, with a furnace having distinct separate and controllable air-inlets which introduce air in regulated quantities to the furnace both through the ash-pit and also at a point where it will meet the fuel-gases, of a draft-flue and a suction-fan by which air is sucked or drawn into and through the furnace, substantially as and for the purposes hereinbefore set forth.

2. The combination, substantially as hereinbefore set forth, of the furnace provided with inlets which introduce air into the furnace both through the ash-pit and at a point where it will meet the fuel-gases, the draft-flue, the suction-fan, and the condenser.

3. The combination, substantially as hereinbefore set forth, of the furnace provided with two sets of air-inlets, the one admitting air to the fire through the ash-pit, the other conducting air into the furnace at a point where it will meet the fuel-gases, the registers or gates for said sets of inlets, and the suction-fan.

4. The combination, substantially as hereinbefore set forth, of the tubular grate-bars open from end to end and discharging air into the furnace at a point beyond the bridge-wall, the ash-pit and air-inlets therein, registers or gates controlling admission of air through said inlets and through the grate-bars, the suction-fan, and the condenser.

5. The combination, substantially as hereinbefore set forth, of hollow grate-bars, suction-fan or air-exhauster, and intermediate water-contact condenser.

In testimony whereof I have hereunto set my hand this 25th day of November, 1881.

EDWARD J. MALLETT, JR.

Witnesses:
HERMANN ALBERT,
E. J. MALLETT.